United States Patent [19]

Lea

[11] Patent Number: 5,383,002
[45] Date of Patent: Jan. 17, 1995

[54] PHOTOGRAPHIC MULTI-FORMAT EASEL

[76] Inventor: Gilbert Lea, 4108 14th St., Des Moines, Iowa 50313

[21] Appl. No.: 11,958

[22] Filed: Feb. 1, 1993

[51] Int. Cl.$^6$ .............................................. G03B 27/58
[52] U.S. Cl. ............................................ 355/74; 355/77
[58] Field of Search ......................................... 355/74, 77

[56] References Cited

U.S. PATENT DOCUMENTS

| 2,315,066 | 3/1943 | Lund | 355/74 |
|---|---|---|---|
| 4,095,892 | 6/1978 | Thornton | 355/74 |
| 4,095,893 | 6/1978 | Handsman | 355/74 |
| 4,160,597 | 7/1979 | Dammn | 355/74 |
| 4,190,356 | 2/1980 | Knapp | 355/74 |
| 4,226,528 | 10/1980 | Kremer | 355/74 |
| 4,314,758 | 2/1982 | Kazierod | 355/40 |
| 4,342,513 | 8/1982 | Gibbs | 355/74 |
| 4,451,142 | 5/1984 | Takenaka | 355/55 |
| 4,475,808 | 10/1984 | Cartwright | 355/74 |
| 4,821,079 | 4/1989 | Yoder | 355/74 |
| 5,022,764 | 6/1991 | Kilgore, Jr. | 356/404 |
| 5,023,652 | 6/1991 | Purro | 355/1 |

OTHER PUBLICATIONS

Page 266, Official Gazette, Nov. 13, 1956.

Primary Examiner—Michael L. Gellner
Assistant Examiner—Daniel P. Malley
Attorney, Agent, or Firm—Zarley, McKee, Thomte, Voorhees & Sease

[57] ABSTRACT

A photographic enlarging apparatus includes an easel having a flat platform with an upstanding wall along a top edge. A carrier for supporting photographic paper is slidably supported on the platform and is placed in contact with a vertical guide surface on the upstanding wall to appropriately orient the carrier on the platform. The carrier includes a generally rectangular frame with a paper support panel mounted within the frame to support a sheet of photographic paper on either the upper surface or the lower surface. The outer peripheral surface of the frame has a plurality of upper indexing apertures aligned longitudinally in the upper half of the outer surface, and a plurality of lower indexing apertures aligned along the lower half of the outer periphery. An indexing pin projecting from the guide surface on the upstanding wall cooperates with the indexing apertures such that the carrier may be indexed with respect to the easel in either an upright or inverted orientation, with either the upper panel surface or lower panel surface directed upwardly. A plurality of various size masking plates are mounted to the upper surface of the upstanding wall and cantilever outwardly over the easel platform and parallel therewith, such that the paper carrier will slide easily between the masking plates and the platform.

21 Claims, 5 Drawing Sheets

PHOTOGRAPHIC MULTI-FORMAT EASEL

TECHNICAL FIELD

The present invention relates generally to photographic enlarging equipment, and more particularly to an easel apparatus which supports a moveable paper carrier selectively positionable on the easel to permit multi-format prints.

BACKGROUND OF THE INVENTION

Apparatus for printing a plurality of photographic prints from a single negative or transparency onto a single sheet of photographic paper are well known in the prior art. Photographic paper is typically purchased in large sheets, such is 8×10 inches, which can be exposed in smaller portions for pictures of various sizes. The large sheet of photographic paper is covered while positioning and focusing is accomplished. Then, after the paper has been positioned and the enlarger focused, a portion of the paper is exposed while other portions of the paper are covered.

Typically, some light is required during the positioning and focusing steps, and it is therefore necessary to cover the entire sheet of photographic paper to preserve its integrity and avoid exposure, thereby ruining the paper.

One method for accomplishing this desired task, is in the provision of an easel with a multiplicity of covers arranged to selectively mask portions of a sheet of photographic paper. In such devices, a cover is opened so as to expose the photographic paper beneath the opened cover. The easel is then moved to a new position wherein another cover is located within the beam of an enlarger bulb, the enlarger is focused, and the exposing process is repeated. The main disadvantage of such a device is that the enlarger must be turned on and off two times for each print. One step requires the enlarger to be turned on to position the covered paper. The enlarger is then shut off and the paper uncovered before the enlarger is turned on again to expose the photographic paper to obtain the print. As a result, the production of a plurality of prints on a single sheet of paper requires a relatively large amount of time.

Prior art easels providing for the printing of a plurality of prints on a single sheet of photographic paper have serious deficiencies, because of the relatively large amount of time required to make prints, and the fact that such easels are relatively complex, making them expensive and difficult to manipulate in total darkness.

SUMMARY OF THE INVENTION

It is therefore a general object of the present invention to provide an improved photographic easel for making a plurality of photographic prints on a single sheet of photographic paper.

Another object is to provide an easel which may be manipulated in the dark so as to eliminate the step of masking the photographic paper while positioning the paper with light on.

Still a further objective is the provision of a photographic easel which allows the photographic paper to be positioned without turning on the enlarger.

A further object of the present invention is to provide a photographic easel which permits the production of a variety of different sized photographic prints utilizing a single easel and paper carrier on a single size sheet of photographic paper.

Another object is the provision of a photographic easel which allows multiple prints to be quickly and easily made on a sheet of photographic paper.

These and other objects will be apparent to those skilled in the art.

The photographic enlarging apparatus of the present invention includes an easel having a flat platform with an upstanding wall along a top edge. A carrier for supporting photographic paper is slidably supported on the platform and is placed in contact with a vertical guide surface on the upstanding wall to appropriately orient the carrier on the platform. The carrier includes a generally rectangular frame with a paper support panel mounted within the frame to support a sheet of photographic paper on either side of the support panel. The outer peripheral surface of the frame has a set of upper indexing apertures aligned longitudinally in the upper half of the outer surface, and a plurality of lower indexing apertures aligned along the lower half of the outer periphery. An indexing pin projecting from the guide surface on the upstanding wall cooperates with the indexing apertures such that the carrier may be indexed with respect to the easel in either an upright or inverted orientation, with either side of the panel surface being directed upwardly. A plurality of various size masking plates are mounted to the upper surface of the upstanding wall and cantilever outwardly over the easel platform and parallel therewith, such that the paper carrier will slide easily between the masking plates and the platform. Various size openings may be formed by the masking plates to produce various size photographic prints on a sheet of photographic paper supported on the carrier panel.

DESCRIPTION OF THE PREFERRED EMBODIMENT

Figures 1, 2, 3, 4, 5:
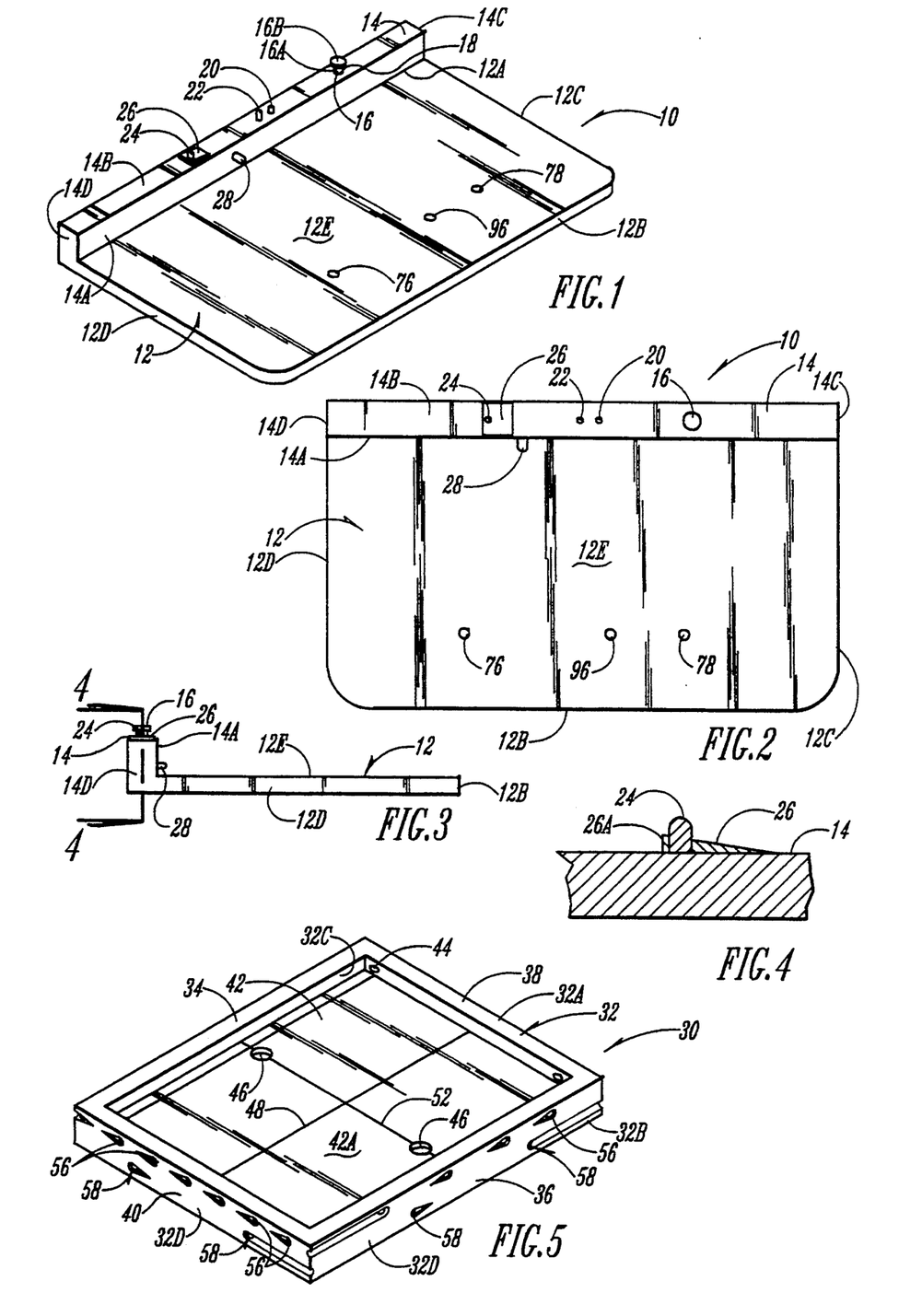
FIG. 1 is a perspective view of the easel of the present invention.
FIG. 2 is a top view of the easel of FIG. 1.
FIG. 3 is a side elevational view taken from the left side of the easel of FIG. 2.
FIG. 4 is a sectional view taken at lines 4—4 in FIG. 3.
FIG. 5 is a perspective view of the top of a paper carrier of the present invention.

Referring now to the drawings, in which similar or corresponding parts are identified with the same reference numeral, and more particularly to FIG. 1, the easel of the present invention is designated generally at 10 and includes a generally rectangular and planar base platform 12 with an upstanding wall 14 along its upper surface 12a. Platform 12 also includes a bottom edge 12b, right edge 12c, left edge 12d, and top surface 12e.

Wall 14 includes a vertical guide surface 14a projecting upwardly from the top edge 12a of platform 12, and an upper surface 14b parallel to the upper surface of platform 12. A series of pins project upwardly from upper wall surface 14b to retain masking plates, as described in more detail below. A first pin 16 has a threaded shank 16a mounted in a threaded aperture 18 spaced from the right end 14c of wall 14. Pin 16 also includes an enlarged head 16b with knurled edges to permit manual turning of the pin into and out of threaded aperture 18. Spaced to the left of first pin 16 is a second projecting pin 20. A third pin 22 is spaced to the left of second pin 20 and is preferably greater in height than second pin 20. A fourth pin 24 is spaced to the left of third pin 22 and spaced to the right of left end 14d of wall 14. As shown more specifically in FIG. 4, fourth pin 24 has a wedge-shaped ramp 26 formed therearound which increases in height from right to left, and with the ramp vertical wall 26a closely adjacent pin 24. The purpose of ramp 26 will be described in more detail below in regard to the masking plates.

Referring now to FIGS. 1, 2 and 3, an indexing pin 28 projects outwardly from the vertical guide surface 14a of wall 14, and is located longitudinally along guide surface 14a at a position intermediate the locations of third pin 22 and fourth pin 24. Indexing pin 28 serves to selectively index the paper carrier 30 (shown in FIG. 5) as described below.

Figures 6, 7:
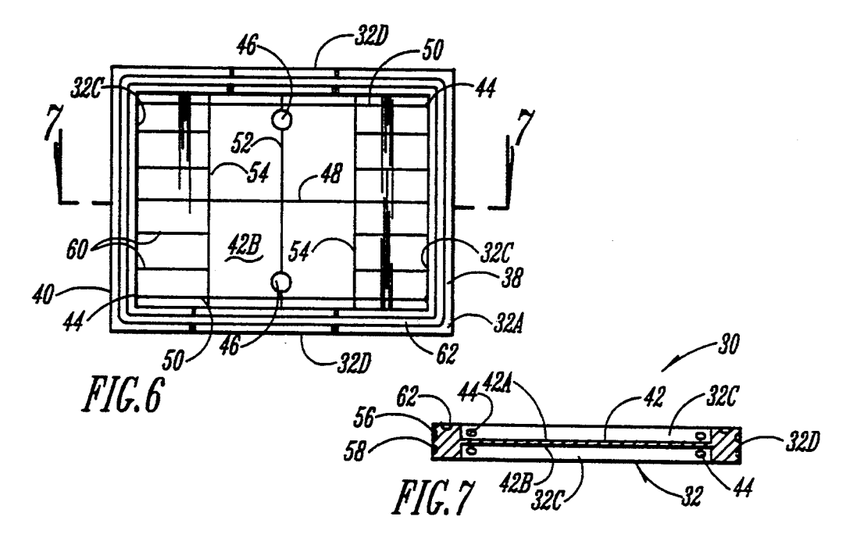
FIG. 6 is a bottom elevational view of the paper carrier of FIG. 5.
FIG. 7 is a sectional view taken at lines 7—7 in FIG. 6.

Referring now to FIGS. 5-7, paper carrier 30 includes a generally rectangular frame 32 formed of a longitudinal top member 34, longitudinal bottom member 36, transverse side member 38, and opposing transverse side member 40. Each frame member 34-40 includes an upper surface 32a, lower surface 32b, inner surface 32c, and outer surface 32d. A thin panel 42 is mounted within frame 32 and extends between the inner surfaces 32c of frame members 34-40, and is located midway between upper and lower frame surfaces 32a and 32b. As shown in FIG. 7, panel 42 divides frame inner surface 32c into an upper surface 32c' and a lower inner surface 32c". For ease of description, outer frame surface 32d will also be considered divided by panel 42 into upper outer surface 32d' and lower outer surface 32d". (Since carrier 30 can be turned over so that either side is facing upwardly, designation to "upper" and "lower" in this description is with reference to the drawings.)

Figure 8:
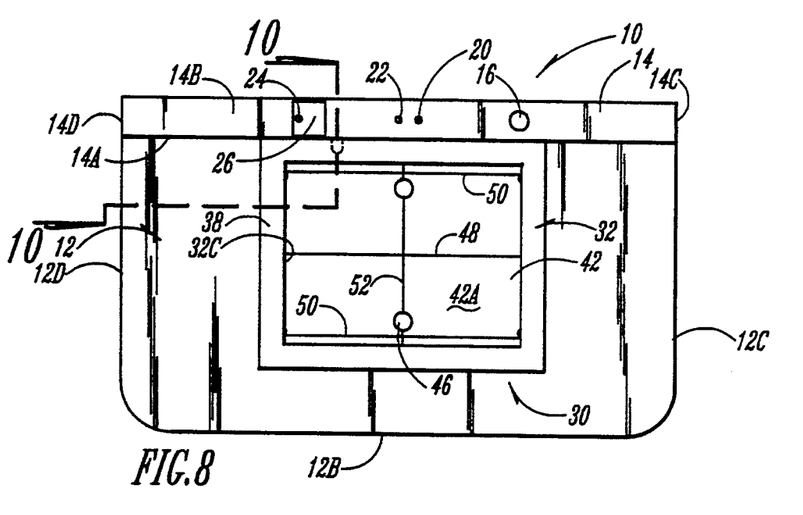
FIG. 8 is a top plan view of the paper carrier installed on the easel.

Panel 42 preferably has dimensions of 8×10 inches, so as to receive a standard single sheet of photographic paper. Rounded buttons or protrusions 44 are positioned on the upper and lower interior surfaces 32c' and 32c" of frame members 38 and 40, and are designed to assist in retaining a sheet of photographic paper flat on either the upper surface 42a or the lower surface 42b of panel 42. A pair of finger holes 46 are formed in panel 42 to permit removal of a sheet of photographic paper by inserting a finger through the finger hole to push the paper away from panel 42. The upper surface 42a of panel 42 is marked with a central longitudinal line 48, a pair of border longitudinal lines 50, and a central transverse line 52, so as to divide the surface into four equal $3\frac{1}{2} \times 5$ inch spaces, as shown in FIG. 8. Bottom surface 42b has the same longitudinal lines 48 and 50 and transverse line 52 marked thereon. In addition, two additional transverse lines 54, are printed on the bottom surface 42b, thereby dividing the lower surface 42b into eight $2\frac{1}{2} \times 3\frac{1}{2}$ inch spaces, as shown in FIG. 6. Thus, the upper and lower panel surfaces 42a and 42b indicate to the user which surface should be facing upwardly for the desired size photograph to be printed. Lines 48, 50, 52, and 54 facilitate composing and focusing of a picture, particularly when a focusing magnifier is used. The masking plates (discussed below) may be removed for such focusing and composing.

Figures 9, 10:
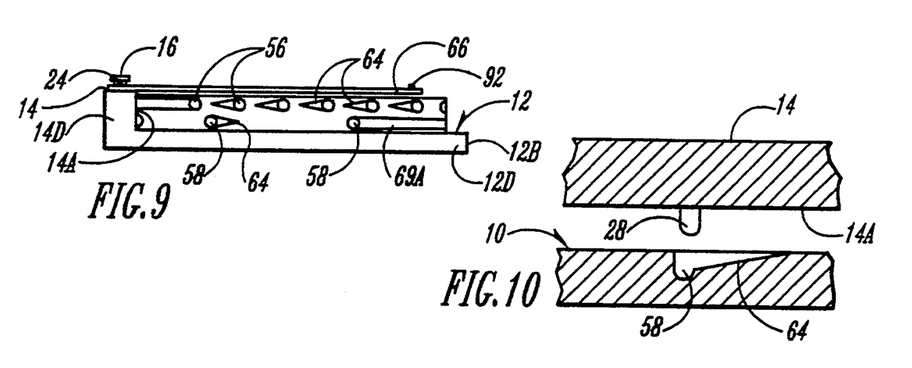
FIG. 9 is a side elevational view taken from the left side of FIG. 8.
FIG. 10 is sectional view taken at lines 10—10 in FIG. 8.
Figure 13:
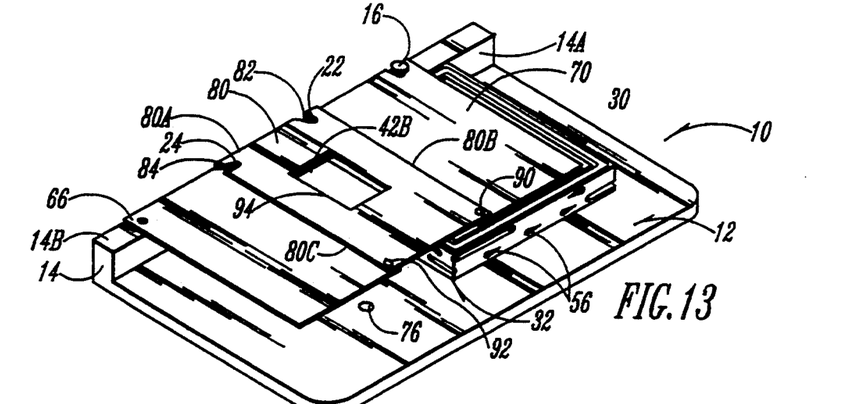
FIG. 13 is a perspective view of the invention with a third masking plate mounted on the easel.

A series of apertures are formed along a line centered or the frame's upper outer surface 32d' and a second series of apertures is located in the frame's lower outer surface 32d", as shown in FIGS. 5 and 9. The upper apertures will be designated generally as apertures 56, while the lower apertures will be designated generally as lower apertures 5S. The indexing pin 28, shown in FIGS. 1 and 2 is located a distance above upper surface 12e of platform 12 so as to align with lower apertures 58 when paper carrier 30 has upper panel surface 42a oriented upwardly (as shown in FIG. 8) and so as to align with upper apertures 56 when lower panel surface 42b is oriented upwardly, as shown in FIG. 13. Thus, lower apertures 58 are utilized to index paper carrier with respect to photographic paper mounted on the upper surface 42a of panel 42, while upper apertures 56 are utilized to index photographic paper mounted on the lower surface 42b.

Lower apertures 58 on frame member 40 are located centrally between central longitudinal line 48 and each inner frame surface 32c on top and bottom frame members 34 and 36. Similarly, lower apertures 58 on the frame outer surface 32d of frame member 36 are located midway between central transverse line 52 and each frame inner surface 32c of side frame members 38 and 40. In this way, frame 32 will be indexed on platform 12 with respect to indexing pin 28, as shown in FIG. 8. Indexing pin 28 will thereby be centered in one of the four spaces defined by transverse line 52 and longitudinal line 48 on upper surface 42a of paper carrier 30. Lower apertures 58 are located in similar locations on the outer surface of frame members 38 and 34 to achieve the same results.

Four upper apertures 56 are uniformly spaced along the frame upper outer surface 32d' of frame members 34 and 36 (as shown in FIG. 5) so as to align indexing pin 28 in one of the four transverse spaces formed by transverse lines 52 and 54 (as shown in FIG. 6).

Similarly, six upper apertures 56 are located along the frame upper outer surface 32d' of frame members 38 and 40 so as to align indexing pin 28 centrally with each of six spaces formed by short longitudinal lines 60 extending between transverse lines 54 and the immediately adjacent frame inner surface of frame side members 38 and 40. The spaces are preferably one half of conventional "wallet size" prints, a size which is commonly used for test strips.

Since the easel 10 and paper carrier 30 will be utilized in the dark, a groove 62 is provided in frame upper surface 32a, as shown in FIGS. 6 and 7, to permit identification by touch.

Referring now to FIGS. 9 and 10, each of upper apertures 56 and lower apertures 58 are provided with a tapered groove 64 which slopes downwardly towards the aperture. Each tapered groove 64 is located in the same direction from the apertures, so as to permit indexing pin 28 to gradually slide through the groove and into the associated aperture. The grooves 64 thereby act as an additional guide for assisting the user in indexing the paper carrier on the index pin 28 of the easel 10. Preferably, each groove 64a for the closest aperture to an edge, is extended completely to the edge to permit immediate journaling of index pin 28 in the groove 64.

Figure 11:
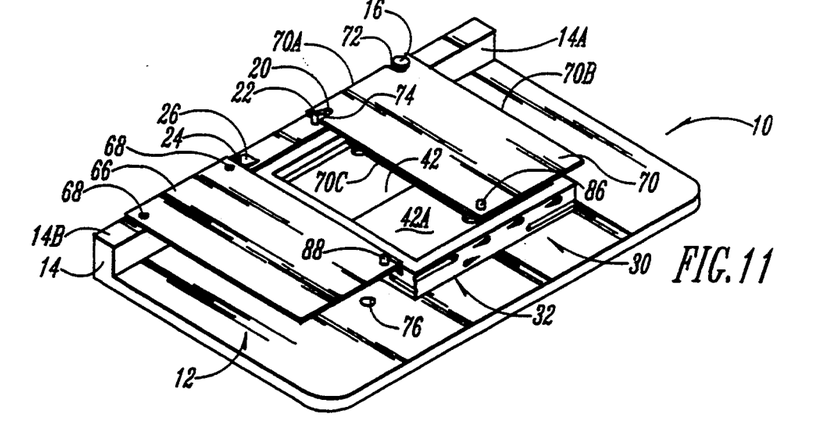
FIG. 11 is a perspective view of the easel of the present invention with the paper carrier thereon, and a pair of masking plates mounted on the easel.
Figure 12:
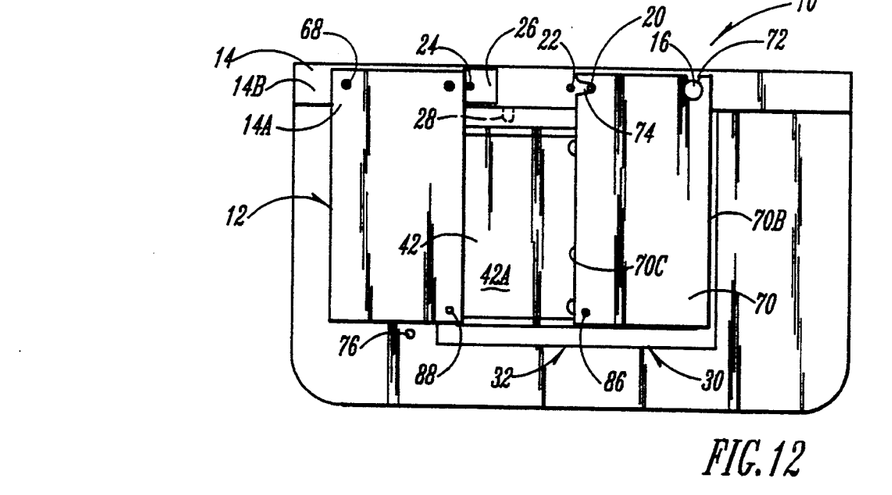
FIG. 12 is a top view of the device shown in FIG. 11.

Referring now to FIGS. 11 and 12, easel 10 has paper carrier 30 positioned on platform 12 against guide surface 14a of guide wall 14. Paper carrier 30 is positioned in an upright position with upper panel surface 42a oriented upwardly. A first masking plate 66 is mounted to upper surface 14b of wall 14 with screws 68 so as to cantilever over platform 12, and parallel thereto. First plate 66 has a length which extends from wall 14 a distance slightly less than the width of paper carrier frame 32, such that a portion of frame 32 projects beyond plate 66.

A second masking plate 70 is removably mounted on wall 14 so as to cantilever over platform 12 in a position spaced to the right of first masking plate 66. Second plate 70 is generally rectangular and has dimensions equal to those of first plate 66. A generally V-shaped slot 72 is formed in the upper edge 70a of second plate 70 adjacent the right edge 70b, to receive the threaded shank of first pin 16 therein. A second V-shaped slot 74 is formed in the left edge 70c of second plate 70 adjacent upper edge 70a, so as to receive second pin 20 therein. Slots 72 and 74 are located so as to align second plate 70 parallel and spaced apart from first plate 66 and approximately five inches apart, so as to match one half of the panel 42 when paper carrier 30 is positioned under plates 66 and 70. Slots 72 and 74 allow masking plate 70 to be quickly and easily mounted on wall 14 in the dark.

In operation, an 8×10 inch sheet of photographic paper is placed on upper surface 42a of paper carrier 30, in complete darkness. Paper carrier 30 is then placed on platform 12 in an upright position and pushed against guide surface 14a of wall 14 until a lower aperture engages index pin 28 (as shown in FIGS. 11 and 12). The user can therefore be assured that masking plates 66 and 70 will mask out the right half of paper carrier 30 such that a 5×7 inch photographic print may be produced on the left half of the paper carrier 30. The photographic paper is then exposed for a predetermined period of time to create the print.

Again, with the lights off, the paper carrier 30 may be pulled slightly away from wall 14 and moved to the left until another lower aperture engages index pin 28. The user can then be assured that the right hand half of paper carrier 30 is aligned in the space between masking plates 66 and 70 for exposing another 5×7 print, without having to turn on lights to confirm the position.

In order to assist in determining the position of paper carrier 30 on platform 12, a small locator dot 76 is painted on platform 12 utilizing glow paint, or the like. Locator dot 76 is positioned so as to be seen below first masking plate 66 immediately to the left of paper carrier 30, when paper carrier 30 is positioned with the left half of upper panel surface 42a exposed between first and second masking plates 66 and 70.

A second locator dot 78 is positioned so as to be seen below masking plate 70 when paper carrier 30 is moved to the left so as to expose the right half of upper panel surface 42a between masking plates 66 and 70. Second locator dot 78 may be seen in FIGS. 1 and 2. Thus, the user can immediately identify the location of paper carrier 30 by virtue of the viewing of either first locator dot 76 or second locator dot 78, which glow in the dark, without having to turn on lights.

Figure 14:
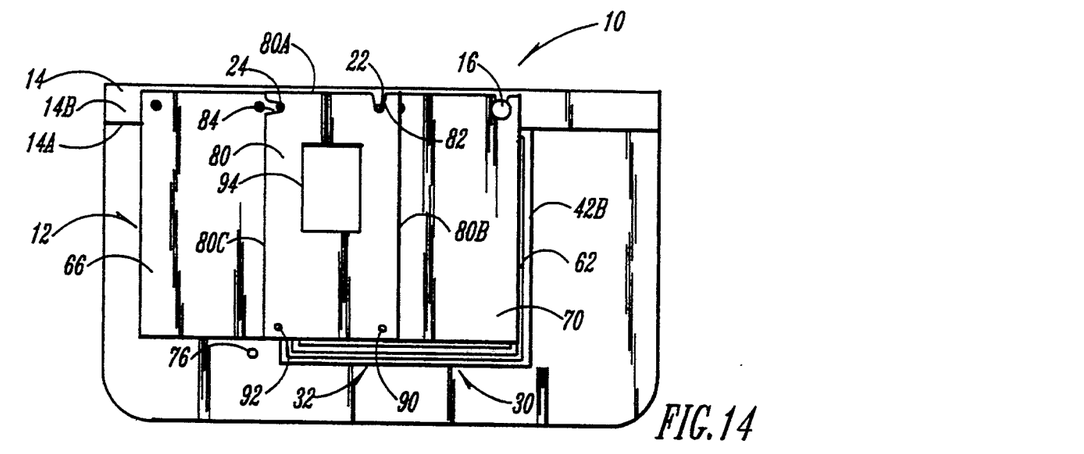
FIG. 14 is a top view of the device shown in FIG. 13.

FIGS. 13 and 14 disclose a third masking plate 80 which has dimensions the same as masking plates 66 and 70. Third masking plate 80 has a generally V-shaped slot 82 in its upper edge 80a adjacent its right edge 80b, designed to receive third pin 22 therein. A second V-shaped slot 84 is formed in the left hand edge 80c of plate 80 adjacent upper edge 80a so as to receive fourth pin 24. A pin 86 (see FIG. 12) in the lower left hand corner of plate 70, and a second pin 88 in the lower right hand corner of plate 66, are journaled through corresponding apertures 90 and 92 respectively in the lower right and left hand corners of plate 80 (see FIG. 13) to fully align plate 80 on top of plates 66 and 70. Ramp 26 (as shown in FIGS. 2, 4 and 12) permits the upper left corner of plate 80 to slide into position with slot 84 receiving pin 24. Ramp 26 and slots 82 and 84 allow masking plate 80 to be quickly and easily positioned in the dark. As shown in FIG. 14, third masking plate 80 has an opening 94 formed therein corresponding with a wallet sized photographic print, defined on the lower panel surface 42b (see FIG. 6) of paper carrier 30. Thus, paper carrier 30 is inverted such that groove 62 in frame 32 is directed upwardly.

As shown in FIG. 13, the four upper apertures 56 are now located so as to engage index pin 28 (not shown in this Figure) on guide surface 14a. In this way, paper carrier 30 is supported on platform 12 against guide surface 14a and may be aligned under window 94 on masking plate 80 four consecutive times along each longitudinal edge of the paper carrier, to produce eight wallet size prints.

A third locator dot 96 on platform 12 (see FIGS. 1 and 2) assists in identifying the position of the inverted paper carrier 30. As shown in FIG. 13 and 14, locator dot 76 is visible when paper carrier 30 is aligned in a first position to expose a print in the upper left corner of panel 42b. When paper carrier 30 is shifted left one position to produce a second print, all three locator dots 76, 78 and 96 would be covered. When paper carrier 30 is shifted to the left to the third position, locator dot 78 would be visible adjacent the right edge of the paper carrier. Finally, when paper carrier 30 is shifted one additional position to the left, both locator dots 78 and 96 would be visible below masking plate 70. It is therefore possible for the user to readily determine the position of the paper carrier without having to turn on lights.

Figure 15:
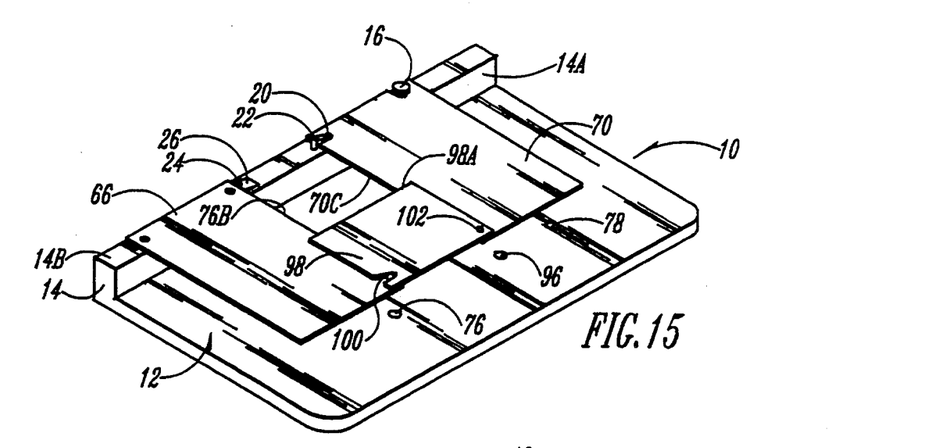
FIG. 15 is a perspective view of the invention with a fourth masking plate replacing the third masking plate.
Figure 16:
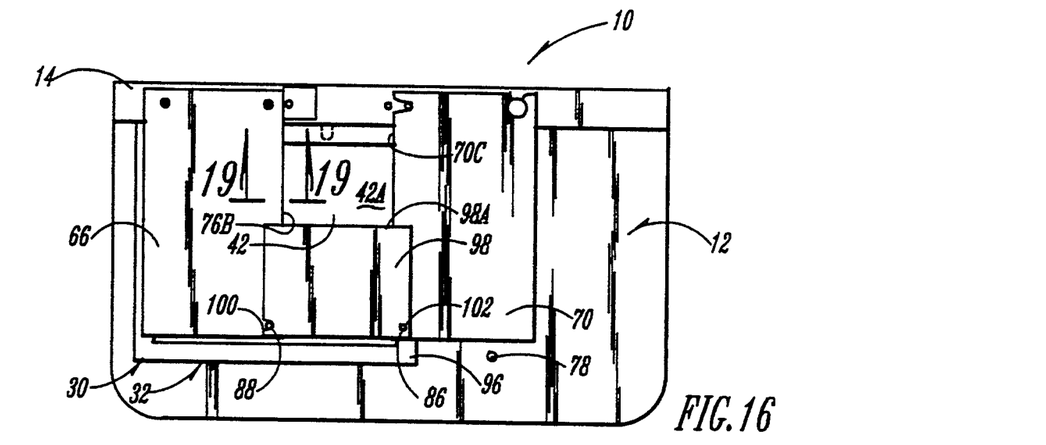
FIG. 16 is a top view of the invention of FIG. 15, with a paper carrier on the easel.

Referring now to FIG. 15, a fourth masking plate 98 is shown mounted atop masking plates 66 and 70. Masking plate 98 has the same width as plates 66 and 70, but has a length approximately one half of plates 66 and 70. In this way, the space above upper edge 98a of plate 98, and between left edge 70c of plate 70 and right edge 76b of plate 66 forms an opening for a conventional 3½×5 inch print. By sliding the carrier along the upright wall in a manner similar to that described above, two prints can be exposed along one longitudinal edge of the carrier. The carrier can then be turned 180° about a vertical axis and slid along the upright wall to expose two prints adjacent the other longitudinal edge. FIG. 16 has paper carrier 30 positioned on easel 10 with upper panel surface 42a oriented upwardly. A V-shaped slot 100 in the lower left corner of masking plate 98 receives pin 88 of plate 66, while an aperture 102 in the lower right corner of plate 98 receives pin 86 of plate 70, to correctly position masking plate 98. Because locator dot 78 is showing to the right of paper carrier 30, the user can identify the position of paper carrier 30 as shifted to the left so as to expose the upper right quadrant of upper panel surface 42a.

Figure 17:
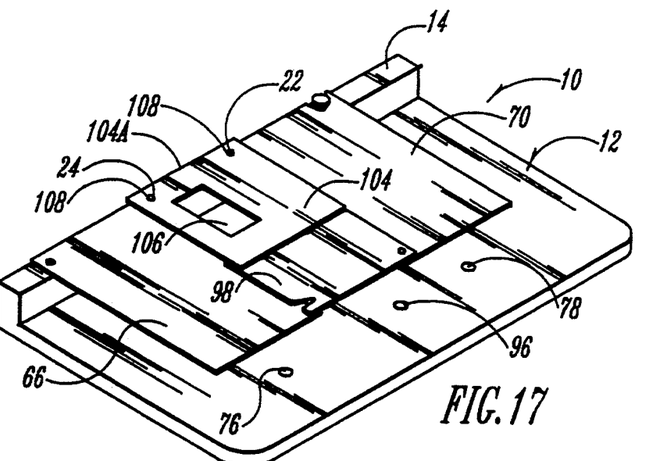
FIG. 17 is a perspective view of the invention with a fifth masking plate mounted on the easel.
Figure 18:
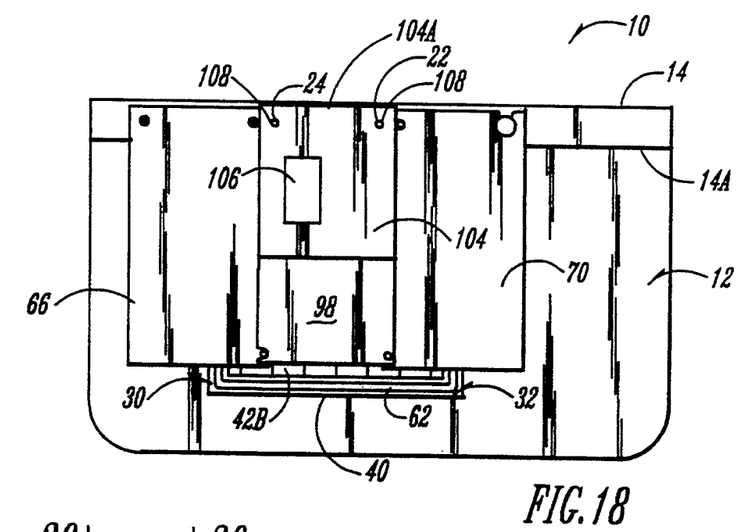
FIG. 18 is a top view of the invention of FIG. 17, with a paper carrier on the easel.

FIGS. 17 and 18 disclose a fifth masking plate 104 which overlies first and second masking plates 66 and 70, as well as fourth masking plate 98, and has a small window 106 therein of a size approximately one half of a wallet size photograph. Window 106 is of a size which is conventionally utilized for photographic test strips, to determine appropriate exposure times and the like. Fifth masking plate 104 has a pair of apertures 108 along its upper edge 104a which are mountable on third and fourth pins 22 and 24 respectively to align the masking plate in the appropriate position.

As shown in FIG. 18, paper carrier 30 is inverted so as to have lower panel surface 42b oriented upwardly. In addition, paper carrier 30 is rotated to a transverse orientation such that one of the short side frame members 38 or 40 is placed against guiding surface 14a of wall 14. In this way, six individual test exposures may be printed along a test strip successively placed under window 106.

It is also possible to make 8×10 inch prints by removing mask 70. The carrier 30 can be positioned with any edge along wall 14a to produce vertical or horizontal 8×10 prints.

Thus, five different sized prints can be made with the device of the present invention.

Figure 19:
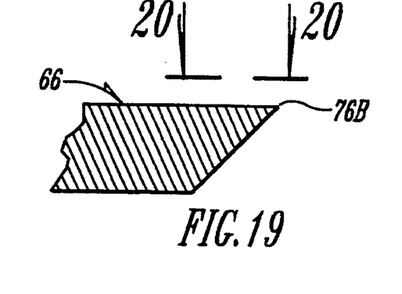
FIG. 19 is a sectional view taken along lines 19—19 of FIG. 16.

As seen in FIG. 19, the inner edge 76b of masking plate 66 is beveled so as to prevent reflection of light that would occur from an edge perpendicular to the primary plane of the plate. The inner edges of the other plates are similarly beveled, including edge 70c of plate 70, edge 98a of plate 98, and the edges surrounding the openings in plates 80 and 104. The bottom of each masking plate is colored black to prevent the reflection of light.

Figure 20:
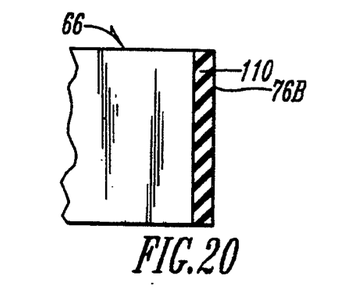
FIG. 20 is a plan view taken along lines 20—20 of FIG. 19.

The upper surface of each masking plate adjacent the inner edges or opening is provided with an alternating black and white line 110, as shown in FIG. 20. Since a projection is always slightly oversized, the dotted or broken line 110 eliminates potential confusion as to the location of the projected image, the edges of which can be seen on the line 110.

Whereas the invention has been shown and described in connection with the preferred embodiment thereof, it will be understood that many modifications, substitutions and additions may be made which are within the intended broad scope of the appended claims. There has therefore been shown and described an improved photographic multi-format easel which accomplishes at least all of the above stated objects.

I claim:

1. A photographic developing easel, comprising:
a generally planar platform with an upper surface and perimeter edges;
an upstanding wall along one of said platform edges, said wall having a guide surface perpendicular to the platform upper surface and an upper surface parallel and spaced above the platform upper surface;
a carrier slidably supported on said platform, said carrier including a generally rectangular frame and a panel mounted within the frame for supporting a sheet of photographic paper;
said carrier frame having an upper surface, a lower surface, an inner surface to which said panel is mounted, and an outer surface extending around the periphery of the frame;
stationary masking means connected to said wall upper surface and extending over said platform in spaced and stationary relation to the upper surface, for masking downwardly directed light from predetermined areas of the platform upper surface;
said carrier selectively slidable on the upper surface of the platform so as to be positionable under said stationary masking means to mask a plurality of predetermined areas of a sheet of photographic paper supported on said carrier panel from downwardly directed light as the carrier is slid to different positions beneath the masking means so as to produce a plurality of single exposure prints on the paper.

2. The apparatus of claim 1, further comprising:
a first half of a cooperable indexing means mounted on said guide surface of said upstanding wall; and
a second half of a cooperable indexing means on said frame outer surface;
said first and second halves of said cooperable indexing means selectively cooperable to position said paper carrier in a predetermined position under said masking means.

3. The apparatus of claim 2, wherein said first half of said indexing means includes an indexing pin projecting outwardly from said guide surface, and wherein said second half of said indexing means includes a plurality of spaced apart indexing apertures formed in said frame outer surface.

4. The apparatus of claim 3:
wherein said panel has a thickness less than the thickness of said frame, and is mounted generally centrally between the upper and lower surfaces of the frame;
said panel having an upper surface and a lower surface;
said frame outer surface including an upper half and a lower half;
said indexing apertures including a plurality of upper apertures aligned longitudinally on said frame outer surface along an upper line located in the upper half of the frame outer surface a predetermined distance from the frame upper surface;
said indexing apertures including a plurality of lower apertures aligned longitudinally on said frame outer surface along a lower line located in the lower half of the frame outer surface a predetermined distance from the frame lower surface;
the distance between the upper line and frame upper surface being equal to the distance between the lower line and frame lower surface;

said indexing pin located a distance above the platform equal to the distance between the lower line and frame lower surface;

whereby the lower indexing apertures are selectively cooperable with the indexing pin when the carrier is oriented with the upper panel surface directed upwardly and the frame lower surface in slidable contact with the platform, and the upper indexing apertures are selectively cooperable with the indexing pin when the carrier is inverted to an orientation with the lower panel surface directed upwardly and the frame upper surface in slidable contact with the platform.

5. The apparatus of claim 4, wherein said frame includes a pair of opposing longitudinal frame members and a pair of opposing transverse frame members, one longitudinal frame member having upper and lower indexing apertures identical to the upper and lower indexing apertures on the opposing longitudinal frame member, and one transverse frame member having upper and lower indexing apertures identical to the upper and lower indexing apertures of the opposing transverse frame member.

6. The apparatus of claim 5, wherein the number of upper indexing apertures is different than the number of lower indexing apertures on each longitudinal and transverse frame member, whereby the location of the carrier on the platform relative to the indexing pin is different when the carrier is oriented upright as compared to an inverted orientation of the carrier.

7. The apparatus of claim 1, further comprising visual indicator means on said platform for indicating the location of the carrier with respect to the platform, when no light source is present.

8. The apparatus of claim 4, further comprising means for indicating the orientation of the carrier in an upright or inverted position.

9. The apparatus of claim 8, wherein said orientation indicating means includes a groove formed along the frame lower surface.

10. The apparatus of claim 1, further comprising means on said carrier frame for retaining a sheet of photographic paper on said panel.

11. The apparatus of claim 1, wherein the masking means is cantilevered over the upper surface of the platform.

12. A method of positioning photographic paper for exposure of selected portions thereof, comprising:
positioning a platform beneath a photographic enlarger, the platform having an upper surface and an upstanding wall;
securing a mask to the platform in spaced and stationary relation above the upper surface of the platform;
placing the photographic paper in a paper carrier having a frame with a perimeter edge;
sliding the carrier on the upper surface of the platform toward the upstanding wall and into a position wherein one selected edge of the carrier engages the upstanding wall of the platform;
sliding the carrier under the stationary mask and along the upstanding wall until an indexing means on the carrier mates with an indexing means on the platform, whereby a portion of the paper will be protected from photographic exposure by the mask;
photographically exposing an unprotected portion of the paper to make a first single exposure print;
sliding the carrier further along the upstanding wall and under the mask while the mask remains stationary and until a second indexing means on the carrier mates with the indexing means on the platform such that a different portion of the paper is protected from exposure by the mask; and
exposing a second unprotected portion of the paper to make a second single exposure print.

13. The method of claim 12 wherein the steps of sliding the carrier along the wall and exposing the paper are alternatingly repeated to create adjacent photographic prints along one edge of the carrier.

14. The method of claim 13 wherein the carrier is turned 180° about a vertical axis, and the steps of sliding the carrier along the wall and exposing the paper are alternatingly repeated to create prints along an opposite edge of the carrier.

15. The method of claim 12 wherein the sliding of the carrier is done in a photographic darkroom without the aid of light.

16. A photographic easel comprising:
a horizontally disposed platform with an upstanding wall;
a rectangular paper carrier having opposite upper and lower surfaces, opposite first and second side edges and opposite third and fourth side edges, the carrier being rotatable about a horizontal axis such that each of the upper and lower surfaces are selectively and slidably engagable with the platform, and the carrier being rotatable about a vertical axis such that each of the first, second, third and fourth side edges are selectively and slidably engagable with the upstanding wall; and
masking means mounted on the platform and extending over the carrier so as to mask predetermined areas of a sheet of photographic paper carrier on the carrier from exposure to light.

17. The easel of claim 16 further comprising an indexing extending from the platform and indexing apertures in the carrier for selective receipt of the pin as the carrier slides along the platform.

18. The easel of claim 17 wherein the indexing pin extends horizontally from the wall of the platform, and the indexing apertures are in the four side edges of the carrier.

19. The easel of claim 18 wherein the spacing between apertures in any one edge is constant, and the spacing between apertures in the first and second edges is different than the spacing between apertures in the third and fourth edges.

20. The easel of claim 18 wherein each edge has two rows of apertures, with the spacing between apertures in one row being different than the spacing between apertures in tile other row.

21. The easel of claim 17 wherein an inclined groove extends from each apertures to facilitate receipt of the pin in the aperture.

* * * * *